July 12, 1932.   R. J. GRAY   1,866,929
COUPLER
Filed Dec. 30, 1929

INVENTOR
RUSSELL J. GRAY
BY
ATTORNEY

Patented July 12, 1932

1,866,929

UNITED STATES PATENT OFFICE

RUSSELL J. GRAY, OF MINNEAPOLIS, MINNESOTA

COUPLER

Application filed December 30, 1929. Serial No. 417,441.

This invention relates to coupling devices for lubricating mechanisms, and the primary object is to provide a coupler unit that is particularly designed for connecting a lubricant supply conduit or chamber to a fitting of the so-called Zerk type, and which unit is practical, efficient, and comparatively simple and cheap to manufacture, with a result that when it becomes worn to the extent that it is ineffective to form a tight connection with the fitting it may be discarded and substituted by a new one without a substantial financial replacement expense as is the case with other coupling devices that have come to my attention. Further and more specific objects will be disclosed in the course of the following specification, reference being had to the accompanying drawing, wherein:

Figure 1:
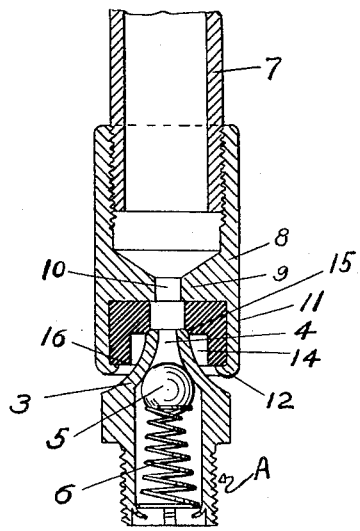
Fig. 1 is a diametrical sectional elevation of my improved coupler unit showing it as connecting a supply member to a fitting of the Zerk type under an initial sealing action.
Figure 2:
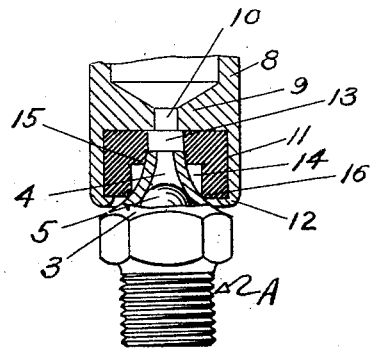
Fig. 2 is a sectional elevation similar to that shown in Fig. 1, but showing the coupler advanced to effect a secondary or auxiliary sealing contact with the fitting.

The fitting, designated generally by the letter A, is secured in the bearing or part to be lubricated, and has a tapered head 3 provided with an axial perforation 4 under which a valve ball 5 is held closed by a spring 6 to normally hold the passage through the fitting closed. The lubricant passes in through the perforation and past the valve ball when injected under sufficient pressure. The device or means for producing such pressure may be of any preferred type. For the purpose of disclosing the present invention it is assumed that grease is provided to the member 7 under suitable pressure and that such pressure may be varied or cut entirely off at will.

The coupling member embodying the present invention comprises a cylindrical unit 8, that screws on the end of the supply member 7. This unit has an integral partition 9 having an axial perforation 10 for the passage of the lubricant. Disposed within the cup shaped chamber formed under the partition 9 is a heavy gasket or washer 11, made up of slightly resilient material such as leather or hard rubber. This member 11 is securely held in place by a rim or bead 12 that is pressed inwardly from the lower edge of the member 8, and is provided with a central perforation 13 which registers with the perforation 10 but is slightly larger so that there will be no tendency on the part of the lubricant to force the gasket downwardly out of place. On the contrary the lubricant pressure developed within the passage 13 will have a tendency to spread the gasket outwardly into its proper position in the chamber. The passage 13, it will be noted, extends only partially through the gasket, where it terminates in an enlarged aperture 14, thus forming an inner annular shoulder 15 and an outer annular shoulder 16. These shoulders form the sealing contacts with the fitting A, but they are so diametrically proportioned that the shoulder 15 will effect the initial sealing contact, as shown in Fig. 1, and the contact between the shoulder 16 and the head 3 will only be effected after the aperture 13 has become spread by long use or by applying more than ordinary pressure when making the coupling connection. Ordinarily the sealing contact between the shoulder 15 and the end of the fitting A is sufficient to make a proper connection while the lubricant is being forced into the fitting. Upon repeated application, however, the passage 13 is bound to become enlarged, at which time the initial seal is supplemented by the seal effected by the larger or outer shoulder 16. When both seals become substantially ineffective the entire coupler unit is preferably discarded for a new one.

The sealing shoulder 16 has a further important function in that it enables a perfect sealing contact to be had even when the end of the fitting head 3 has become bruised or distorted out of shape, which frequently happens to exposed fittings on motor vehicles. In such cases a single point of contact at the end of the fitting head will not be sufficiently tight to prevent leakage of grease, but by forcing the coupler further on, to complete the contact at 16, there is practically no chance for any leakage to occur.

It will be seen that as the gasket 11 is made of resilient or semi-flexible material its contact shoulders will accommodate the fitting head 3 even if the coupler unit is not directly aligned with the fitting. This is an important consideration in view of the fact that the coupler can frequently be applied with convenience only at a slight angle from the axis of the fitting.

It is understood that suitable modifications may be made in the structure as disclosed, provided such modifications come within the spirit and scope of the appended claims. Having now, therefore, fully illustrated and described my invention, what I claim to be new and desire to protect by Letters Patent is:

1. A coupler unit for connecting a lubricant supply member to a fitting having a tapered receiving head, said coupler unit comprising a cylindrical member, a gasket secured in one end of the member and having an axial perforation for the passage of lubricant to the fitting head, said perforation being substantially reduced at its inner end to form an inner sealing shoulder and an outer sealing shoulder for sealing contact with the fitting head.

2. A coupler unit for connecting a lubricant supply member to a fitting having a tapered receiving head, said coupler unit comprising a cylindrical member, a gasket secured in one end of the member and having an axial perforation for the passage of lubricant to the fitting head, said perforation being substantially reduced at its inner end to form an inner shoulder for initial sealing contact with the fitting head, and the outer relatively larger end of the perforation having a shoulder for secondary sealing contact with the fitting head.

3. A coupler unit for connecting a lubricant supply member to a fitting having a tapered receiving head, said coupler unit comprising a cylindrical member, a gasket secured in one end of the member and having an axial perforation for the passage of lubricant to the fitting head, said gasket having inner and outer annular sealing shoulders so proportioned with respect to the dimensions of the fitting head that the inner shoulder will form an initial sealing contact therewith and the outer shoulder will form a second sealing contact with the head when sufficient pressure is applied in connecting the coupler to the fitting.

4. A coupler unit for connecting a lubricant supply member to a fitting having a tapered receiving head, said coupler unit comprising a cylindrical member, a gasket secured in one end of the member and having an axial perforation for the passage of lubricant to the fitting head, said gasket having an inner annular sealing shoulder and an outer annular sealing shoulder, said shoulders being so proportioned with respect to the dimensions of the fitting head that the inner shoulder will form an initial sealing contact therewith, and the outer shoulder will form a second sealing contact with the head when sufficient pressure is applied in connecting the coupler to the fitting, said gasket being formed of resilient material and secured in place by integral inwardly bent portions of the cylindrical member.

Signed at Minneapolis, Minnesota, this 19th day of December 1929.

RUSSELL J. GRAY.